No. 701,767. Patented June 3, 1902.
E. SENDELBACH.
VEHICLE HUB.
(Application filed Feb. 5, 1902.)
(No Model.)
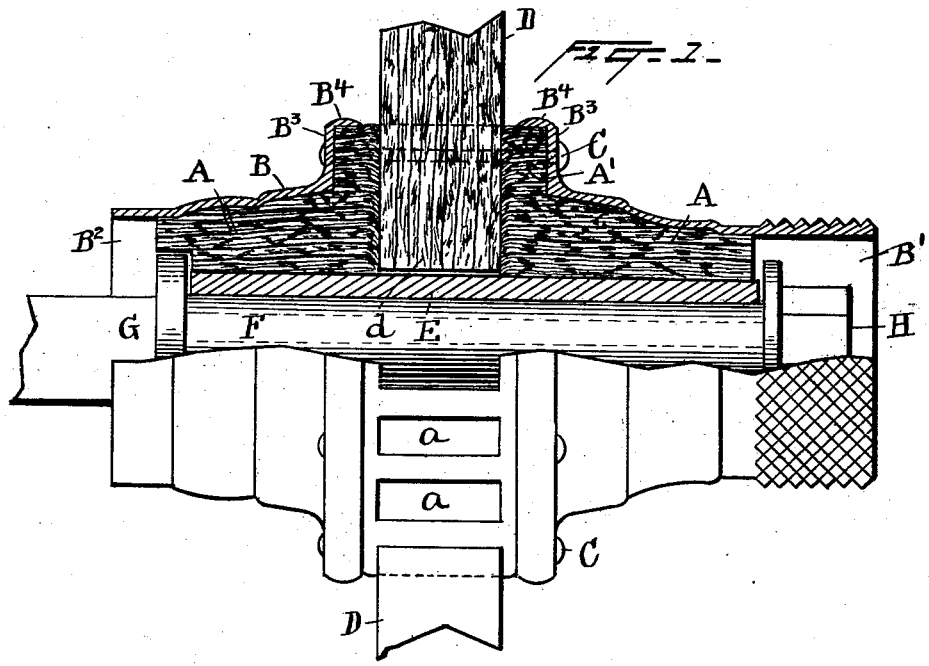
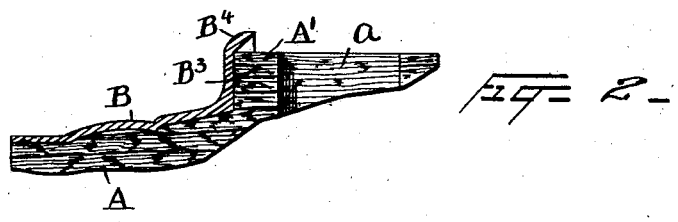
WITNESSES
Norris A. Clark.
Francis M. Phelps
INVENTOR
Edward Sendelbach,
By Geo. W. Whitney
ATT'Y

UNITED STATES PATENT OFFICE.

EDWARD SENDELBACH, OF TERRE HAUTE, INDIANA.

VEHICLE-HUB.

SPECIFICATION forming part of Letters Patent No. 701,767, dated June 3, 1902.

Application filed February 5, 1902. Serial No. 92,633. (No model.)

*To all whom it may concern:*

Be it known that I, EDWARD SENDELBACH, a citizen of the United States, residing at Terre Haute, in the county of Vigo and State of Indiana, have invented certain new and useful Improvements in Vehicle-Hubs; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to hubs for vehicles;
and its object is to provide a wooden hub having end portions of reduced diameter surrounded by metal shells, a central portion of larger diameter suitable to receive the usual spoke-tenons and sustained against lateral pressure by upright flanges on the shells, and a metallic box unconnected with the other metal portions of the hub. Such a hub can be fitted to axle-bearings of any given taper by simply boring out the hub and inserting a box of the required taper. The flanges on the shells abut closely against the ends of the central portion and being securely clamped thereto by bolts or rivets sustain the wood and cause it to be compressed endwise and solidified when the spokes are driven. On each flange is a lip which is compressed tightly upon the outer surface of the enlarged center of the hub, so as to solidify the wood radially.

In hubs of the so-called "Concord" construction (shown in my Patent No. 651,276) the box is integral with one of the flanges which compresses and sustains the short wooden center. It is found that certain classes of wagon-builders use bearings of special shape and taper. In order to provide a hub having the Concord advantages with respect to solidification of the wooden spoke-receiving portion and an attractive and elegant appearance by reason of the ends of the hub being small and graceful and yet permit builders to suit their own wishes as to the size and taper of the bearing, I provide a "loose" box—that is, a box separate from the other metal portions of the hub. As the wooden portion can be bored out to take a box of any taper, this enables me to use the same hub for customers requiring different styles of bearings.

In the accompanying drawings, Figure 1 is a side elevation, partly in section, of my new hub. Fig. 2 is a detail view showing one of the lips before it is compressed.

The body of the hub is of wood, having end portions A of small diameter and a central portion A' of larger diameter, suitable for affording an adequate support to the spokes. Each end portion A is encircled by a thin metal shell or jacket B, preferably made of malleable cast-iron and of graceful and elegant contour and preferably covering the hub from the enlargement to its end. The pointband B' may be integral with the front shell and may be suitably roughened to serve as a step. The back shell may have a sand-band $B^2$ integral with it. Each shell has a flange $B^3$ at its inner end extending outwardly in a plane substantially perpendicular to the axis of the hub. These flanges fit closely and smoothly against the ends of the central enlargement A', so that when the shells are pressed onto the hub the flanges will abut against the central enlargement and compress it endwise with all the force of the powerful hydraulic press used for this purpose. After the shells have been pressed on bolts or rivets C are passed through suitable holes in the flanges $B^3$ and the central enlarged portion A' to hold all these parts firmly and rigidly together.

In order to obtain not only an endwise but a radial compression of the hub, each flange $B^3$ is provided around its edge with an integral lip $B^4$, normally inclined, as shown in Fig. 2, so as not to come in contact with the wooden hub when the shells are pressed on. After the shells have been forced home the lips are bent down upon the wooden enlargement A' by any suitable mechanism, so as to strongly compress the wood all around the ends of said enlargement, the pressure being exerted in a radial direction. This not only assists in the solidification of the hub, but prevents the wood from "shelling." The outer surface of the enlargement A' is preferably cylindrical, as shown, so that the inner surface of the lips when they have been compressed upon said enlargement will be perpendicular to the flanges. The hub having been thus compressed between the flanges and by the lips, the spokes D are then driven. The tenons $d$ of the spokes are made slightly larger than the mortises $a$ and preferably somewhat tapering, so that when driven tightly into place they expand the mortises, thereby still further compressing the fibers of the hub. As the enlargement A' is not over an inch longer than the mortises the comparatively small amount of wood between the spoke-tenons and the flanges is solidified and hardened very greatly by the operation of driving the spokes, and thus affords a firm support for the spokes, so that they are enabled to successfully resist side strains. The wheel therefore stands up better and runs true longer than a wheel in which the hub is not so solidified. Moreover, the solidifying of the wood prevents it from checking, splitting, and shelling. In order to get this result, the ends of the enlargement A' and the surfaces of the flanges must stand at substantially right angles with the axis of the hub, since if they are at all inclined so that the flanges are cupped the terrific pressure to which they are subjected by the hydraulic press will burst them open, the two inclined surfaces exerting a wedging action on each other. This bursting strain is set up to a certain extent in the shells B; but their taper is so comparatively slight that the wooden hub will yield and fit itself to the shells without offering resistance enough to burst them. Moreover, the flanges $B^3$ greatly strengthen the shells to resist this bursting strain.

The box E is loose—that is to say, it is simply a tapered bushing driven into the central bore of the wooden hub. It can be made of any desired taper to suit any given axle-bearing F. The axle has the usual collar G and retaining-nut H, between which the box E fits easily. Instead of the metallic axle and bearing shown any other may be substituted, such as a wooden axle and metallic skein.

Having thus described my invention, what I claim is—

1. A vehicle-hub, consisting of a wooden body provided with a central enlargement having its ends lying substantially in planes perpendicular to its axis, metallic shells surrounding said body and provided with flanges fitting tightly against said enlargement, and lips on said flanges compressed upon the outer surface of the enlargement.

2. In a vehicle-wheel, the combination with a wooden body provided with a central enlargement, of metallic shells surrounding the end portions of said body and having flanges fitting tightly against the ends of said enlargement, lips on said flanges compressing said enlargement radially, bolts clamping the flanges and enlargement together lengthwise, and spokes having tapering tenons driven into said enlargement, the wood of the enlargement being thereby compressed and solidified both radially and lengthwise.

In testimony whereof I affix my signature in presence of two witnesses.

EDWARD SENDELBACH.

Witnesses:
  W. H. CROOK,
  W. C. CLARK.